J. J. FAHRNEY.
VEHICLE WHEEL.
APPLICATION FILED JAN. 11, 1913.
1,087,226.
Patented Feb. 17, 1914.
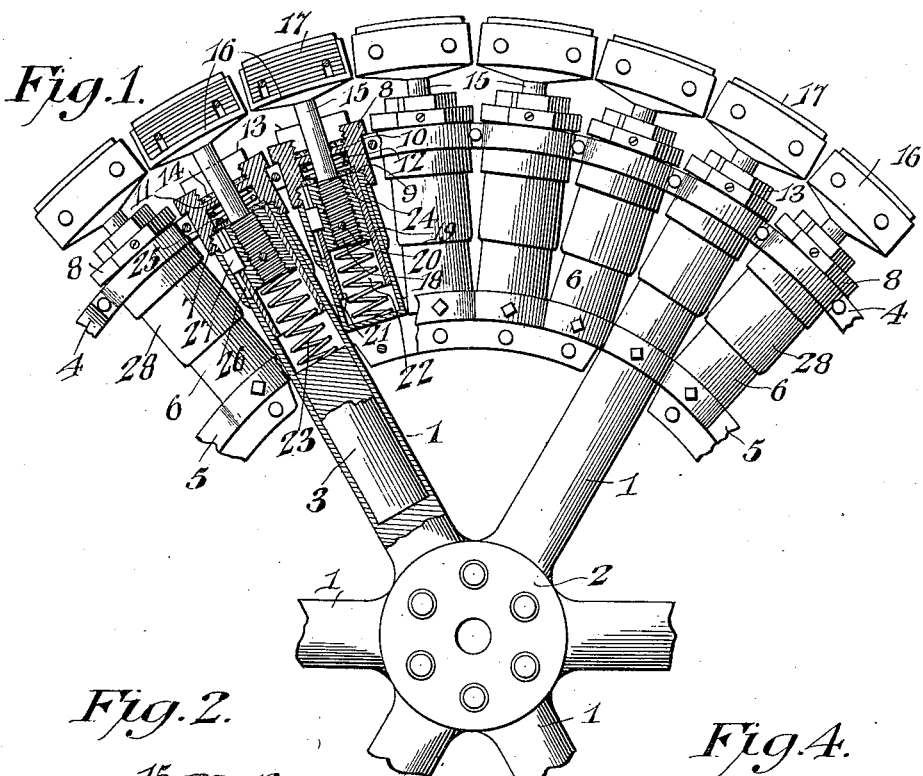
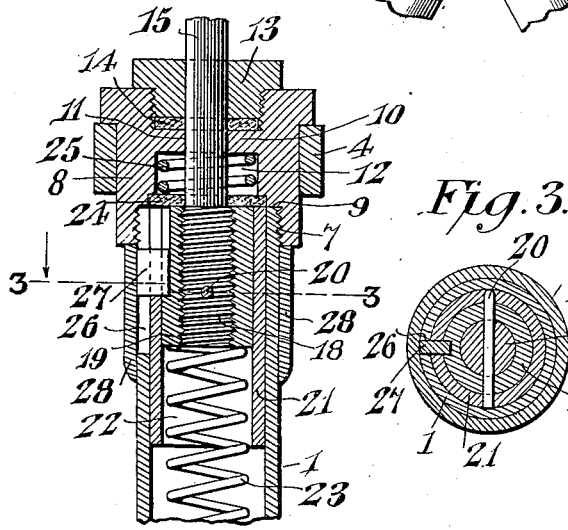
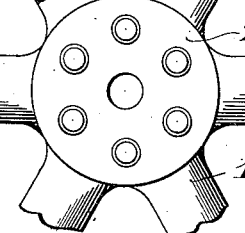
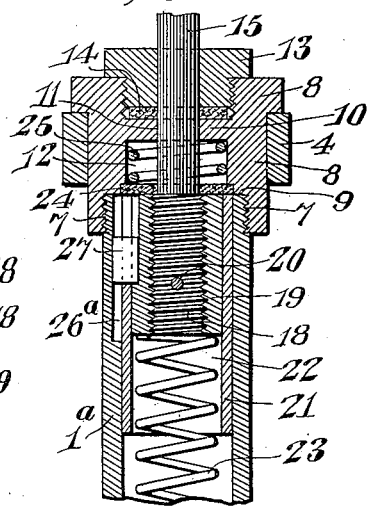
WITNESSES
Jas. K. McCathran
F. T. Chapman.
John J. Fahrney, INVENTOR
BY
E. G. Siggers
ATTORNEY

UNITED STATES PATENT OFFICE.

JOHN J. FAHRNEY, OF TIMBERVILLE, VIRGINIA, ASSIGNOR OF ONE-THIRD TO JOHN P. BURKE, OF HARRISONBURG, VIRGINIA, AND ONE-SIXTH TO JOHN T. HELBERT AND ONE-SIXTH TO FRANK H. DRIVER, BOTH OF TIMBERVILLE, VIRGINIA.

VEHICLE-WHEEL.

1,087,226.   Specification of Letters Patent.   Patented Feb. 17, 1914.

Application filed January 11, 1913. Serial No. 741,602.

*To all whom it may concern:*

Be it known that I, JOHN J. FAHRNEY, a citizen of the United States, residing at Timberville, in the county of Rockingham and State of Virginia, have invented a new and useful Vehicle-Wheel, of which the following is a specification.

This invention has reference to improvements in vehicle wheels, and its object is to provide a wheel having an elastic tread portion so associated with the main body of the wheel that it will elastically yield to a limited extent to produce effects simulating those of a pneumatic tire though a solid tire be used, and no air cushions be provided.

The present invention has to do with certain details of construction of a type of wheel shown in my application No. 652,873, filed October 4, 1911, and my application No. 737,906, filed December 20, 1912, the present invention being more closely related to the structure of the second-named application than to that of the first.

The present invention comprises means for mounting the sliding stems carrying the tread member of the wheel so that these parts may be cheaply and expeditiously constructed and certain effects which may result from shocks and jars are avoided.

The invention will be best understood from a consideration of the following detailed description, taken in connection with the accompanying drawings forming a part of this specification, with the further understanding that while the drawings show a practical form of the invention, the latter is by no means limited to any exact conformity with the showing of the drawings, but may be changed and modified so long as such changes and modifications mark no material departure from the salient features of the invention.

In the drawings:—Figure 1 is an elevation with parts in section of a portion of a wheel embodying the present invention. Fig. 2 is a section on the same plane as the sectional portions of Fig. 1 but limited to a terminal portion of one of the spokes or sockets and drawn to a larger scale than Fig. 1. Fig. 3 is a section on the line 3—3 of Fig. 2. Fig. 4 is a view similar to Fig. 2 but illustrating a somewhat different construction.

Referring to the drawings there are shown spokes 1 radiating from a hub 2, which latter may be constructed in the manner set forth in the aforesaid application No. 652,873. The spokes 1 are hollow throughout the greater portion of their length and for purposes of lightness this hollow part may reach close to the hub 2, in which case filling blocks 3 are employed. The outer ends of the spokes are joined by a ring 4 and at a point closer to the hub the spokes are joined by another ring 5, but these rings need not be specifically referred to since they form no part of the present invention and are fully shown and described in the aforesaid application No. 652,873. Between the spokes sleeves 6 are lodged, each sleeve being closed at one end where it is held by the ring 5, and the other end is coincident peripherally with the outer ends of the spokes, the sleeves 6 filling the spaces between the spokes, and so far as the present invention is concerned the sleeves and spokes are substantially identical, so that a description of the present invention with respect to a spoke will apply with equal force to a sleeve 6.

The outer end of each spoke and the corresponding end of a sleeve 6 is exteriorly screw threaded, as indicated at 7, which screw threaded end enters one end of a guide collar 8 until it abuts against an inner shoulder 9. The collar 8 is formed with an intermediate web 10 having a central passage 11 therethrough, and between the web 10 and the end of the collar applied to the spoke 1 there is formed a chamber 12. On the other side of the web 10 the collar 8 is axially countersunk and internally threaded to receive a nut 13 and packing 14, the nut being diametrically split, as indicated in Fig. 1, for ready application and removal without disturbing other parts. The nut is traversed by a stem 15 which also passes through the packing 14 and the passage 11 in the web 10. The outer end of the stem 15 is expanded into a nut-like head 16 which in the particular instance shown forms a receptacle for a tread block 17, but may be otherwise formed as desired. The end of the stem 15 remote from the head 16 enters an appropriate distance into the interior of the spoke and there is screw threaded, as indicated at 18, it being preferable to upset or thicken the screw threaded portion to avoid weakening the stem by the cutting of the threads. Applied to the screw threaded portion is a bushing 19 held to the stem 15 by a pin 20 or in any other suitable manner in addition to the threading of the interior of the bushing to match the threads 18. Moreover, the bushing carries a sleeve 21 making a snug yet easy fit with the interior of the spoke 1 or sleeve 6 as the case may be, so as to readily move lengthwise thereof. The sleeve 21 extends beyond the end of the bushing 19 toward the hub 2, thereby forming a pocket 22 for receiving the corresponding end of a spring 23 lodged within the spoke or sleeve and at the other end abutting against the filling block 3 or the closed end of the sleeve 6, as the case may be. The shoulder 9 of the collar 8 is sufficiently extensive to form an abutment for the corresponding end of the sleeve 21 and bushing 19, and lodged against this shoulder is a washer 24 of felt or leather or some other such material, operating as a buffer for the corresponding end of the sleeve 21. Lodged in the chamber 12 is a spring 25 bearing at one end against the web 10 and at the other against the sleeve 21 or bushing 19 or both.

In the structure shown in Fig. 2 the spoke 1 is made of quite thin metal and hence is provided with an entering slot 26 at the outer end to receive a key 27 carried by and fast to the sleeve 21 and bushing 19, this key being in the form of a block capable of moving lengthwise of the slot 26. To protect the outer edge of the key 27, there is provided a cuff 28 which may be shrunk on the spoke 1 or sleeve 6 as the case may be. Where the metal of the spoke is thicker, such a spoke being indicated at 1ª in Fig. 4, the slot 26 may be replaced by a groove 26ª also indicated in Fig. 4, and in this arrangement the cuff 28 is omitted as unnecessary.

The arrangement of the stems 15 threaded at the inner ends with the bushing 19 and sleeve 21 permits economical manufacture of the structure, and at the same time contributes to the strength thereof, while permitting the ready yielding of the individual stems as the load is brought upon them, the spring 23 being, of course, of sufficient strength to uphold the load with a certain degree of elasticity, but yielding to a larger extent to sudden shocks and jars, thus saving the vehicle from the effects thereof. When the spring is relieved from the load the stems are projected until further movement is arrested by the engagement of the sleeve 21 with the washer 24, lodged against the shoulder 9. The projecting movement of the stem under the action of the spring 23 is, however, arrested to an extent by the spring 25 which on the compression of the spring 23 has expanded. The spring 25 in conjunction with the washer 24 forms a deadening buffer which serves to eliminate noise which would otherwise occur, as the wheel rotated, due to the projection of the stems 15. Such forcible projection of the stems 15 in the absence of the springs 25 and washers 24 would result in disagreeable noise, and also shocks and jars which might be felt on the vehicle. These undesirable conditions are, however, eliminated by the presence of the spring 25 and washer 24, together acting as an elastic and noise deadening buffer. It is also of importance to prevent the stems 15 from rotating in their bearings, and hence the keys 27 are provided, such keys representing very little cost in manufacture, it being the purpose of the present invention to produce a device which may be readily manufactured at a minimum cost and still accomplish the purpose desired.

The nut 13 is made of hardened metal so as to operate as a wear bearing for the stem 15 and further may serve as an abutment for the head 16 in case of excessive pressure being brought to bear upon the tread. The bushing 19 and sleeve 21 may be brazed or otherwise firmly united so that they are effectively one piece and as the stem is pinned to the bushing and sleeve the inner enlarged end of the stem is effectively a one piece structure, although structurally made of a plurality of pieces, as is advisable for cheapness and strength of construction.

What is claimed is:—

1. A vehicle wheel provided with hollow spokes and intermediate sleeves, stems entering the outer ends of the spokes and sleeves and carrying a wheel tread, a collar on the outer end of each spoke and sleeve and having an intermediate web and a chamber between the web and corresponding end of the spoke or sleeve, a bushing at the inner end of the stem, a sleeve applied to the bushing and movable within the spoke or first-named sleeve, a spring at one end engaging the bushing and there entering the sleeve carried by the bushing and at the other end engaging a relatively fixed part of the spoke or first-named sleeve, another spring between the outer end of the bushing and its sleeve and the web of the collar, a washer of soft material between the collar and the adjacent end of the bushing and its sleeve, and a key carried by the bushing and its sleeve, the spoke or first-named sleeve being provided with a longitudinal key-way for the key.

2. A vehicle wheel provided with hollow spokes and intermediate sleeves, stems entering the outer ends of the spokes and sleeves and carrying a wheel tread, a collar on the outer end of each spoke and sleeve and having an intermediate web and a chamber between the web and corresponding end of the spoke or sleeve, a bushing at the inner end of the stem, a sleeve applied to the bushing and movable within the spoke or first-named sleeve, a spring at one end engaging the bushing and there entering the sleeve carried by the bushing and at the other end engaging a relatively fixed part of the spoke or first-named sleeve, another spring between the outer end of the bushing and its sleeve and the web of the collar, a washer of soft material between the collar and the adjacent end of the bushing and its sleeve, and a key carried by the bushing and its sleeve, the spoke or first-named sleeve being provided with a longitudinal key-way for the key, and the stem being threaded where engaging the bushing and provided with means for holding it normally against rotation in the bushing.

3. A vehicle wheel provided with hollow spokes and intermediate radial sleeves, a stem for each spoke and sleeve entering the outer end thereof, said stem having means for engaging a tread at the outer end and at the inner end having a lateral enlargement movable lengthwise of the spoke or sleeve within the same, a collar applied to the outer end of the spoke or sleeve and provided with a chamber about the stem on the side toward the spoke or sleeve, a spring having a normal tendency to project the stem and contained within the spoke or sleeve, and elastic means retained by and lodged in the chamber of the collar and operating as a buffer for the stem on its outward movement.

4. A vehicle wheel provided with hollow spokes and intermediate radial sleeves, a stem for each spoke and sleeve entering the outer end thereof, said stem having means for engaging a tread at the outer end and at the inner end having a lateral enlargement movable lengthwise of the spoke or sleeve within the same, a collar applied to the outer end of the spoke or sleeve and provided with a chamber about the stem on the side toward the spoke or sleeve, a spring having a normal tendency to project the stem and contained within the spoke or sleeve, and elastic means retained by the collar and operating as a buffer for the stem on its outward movement, said elastic means comprising a spring within the chamber having one end arranged to engage the collar and the other end arranged in the path of the enlargement of the stem, and a washer of soft material lodged between the collar and enlarged portion of the stem.

5. A vehicle wheel provided with radial hollow spokes and intermediate sleeves, a collar applied to the outer end of each spoke and sleeve and provided with an intermediate web with a chamber between the web and the corresponding end of the spoke or sleeve, the chamber being bordered by a radial shoulder overhanging the corresponding end of the spoke or sleeve, a stem entering the spoke or sleeve through the collar, said stem having tread carrying means at the outer end and a lateral enlargement at the inner end of greater diameter than the chamber within the collar, and elastic means within the chamber and between the shoulder on the collar and the corresponding end of the enlargement of the stem.

In testimony, that I claim the foregoing as my own, I have hereto affixed my signature in the presence of two witnesses.

JOHN J. FAHRNEY.

Witnesses:
B. W. HITE,
J. A. GARBER.

Copies of this patent may be obtained for five cents each, by addressing the "Commissioner of Patents, Washington, D. C."